US007668952B2

(12) United States Patent
Tylutki et al.

(10) Patent No.: US 7,668,952 B2
(45) Date of Patent: Feb. 23, 2010

(54) APPARATUS, SYSTEM, AND METHOD FOR CONTROLLING A PROCESSING SYSTEM

(75) Inventors: Marcus A. Tylutki, Morgin Hill, CA (US); Noshir C. Wadia, Morgan Hill, CA (US)

(73) Assignee: Internationla Business Machines Corporation, Armonk, NY (US)

( * ) Notice: Subject to any disclaimer, the term of this patent is extended or adjusted under 35 U.S.C. 154(b) by 314 days.

(21) Appl. No.: 11/845,479

(22) Filed: Aug. 27, 2007

(65) Prior Publication Data

US 2009/0063616 A1 Mar. 5, 2009

(51) Int. Cl.
*G06F 15/16* (2006.01)
(52) U.S. Cl. .................. 709/223; 709/203; 709/220; 709/226; 709/232; 709/244; 370/203; 370/229; 370/254
(58) Field of Classification Search .......... 709/203, 709/232, 220, 226, 244, 223; 370/203, 229, 370/254
See application file for complete search history.

(56) References Cited

U.S. PATENT DOCUMENTS

| | | | |
|---|---|---|---|
| 6,865,567 B1 * | 3/2005 | Oommen et al. ............... 707/2 |
| 6,970,805 B1 * | 11/2005 | Bierma et al. ............... 702/182 |
| 6,996,064 B2 * | 2/2006 | Klassen et al. ............... 370/238 |
| 2002/0198985 A1 * | 12/2002 | Fraenkel et al. ............. 709/224 |
| 2003/0046396 A1 * | 3/2003 | Richter et al. ............... 709/226 |
| 2003/0212798 A1 * | 11/2003 | Furuskar et al. ............. 709/227 |
| 2004/0136379 A1 * | 7/2004 | Liao et al. ............... 370/395.21 |
| 2005/0114429 A1 * | 5/2005 | Caccavale ................... 709/200 |
| 2005/0165915 A1 * | 7/2005 | Hejna ......................... 709/219 |
| 2005/0240935 A1 | 10/2005 | Ramanathan ............... 718/105 |
| 2006/0168230 A1 * | 7/2006 | Caccavale et al. ........... 709/226 |
| 2007/0283016 A1 * | 12/2007 | Pendarakis et al. ......... 709/226 |

OTHER PUBLICATIONS

Ghandeharizadeh et al. "A Comparison of Techniques to Estimate Response Time for Data Placement," Springer Verlag Berlin Heildelberg 2002.*
Gunther, "How to Get Unbelievable Load Test Results," Team Quest http://www.teamquest.com/resources/gunther/display/1/index.htm May 25, 2007.

* cited by examiner

*Primary Examiner*—Alina N. Boutah
(74) *Attorney, Agent, or Firm*—Kunzler & McKenzie

(57) ABSTRACT

An apparatus, system, and method are disclosed for controlling a processing system. The apparatus to control a processing system is provided with a plurality of modules configured to functionally execute the necessary steps of controlling a processing system. These modules in the described embodiments include a data acquisition module that acquires performance data for a processing system, a data analysis module that calculates the slope between adjacent data points, a data normalization module that normalizes the data and computes a second order difference between the calculated slopes, a performance analysis module that determines the performance value that corresponds to the maximum calculated slope, a performance comparison module that sets a preferred performance threshold, and a performance control module that controls the processing system to achieve the preferred performance threshold.

20 Claims, 5 Drawing Sheets

400

410

$$\text{Slope}(i) = \frac{\text{Range}(i+1) - \text{Range}(i)}{\text{Range}(i)}$$

420

$$R(i, i-1) = \frac{\text{Slope}(i) - \text{Slope}(i-1)}{\text{Slope}(i-1)}$$

430

$$M(i) = \frac{R(i, i-1) - R(i-1, i-2)}{R(i-1, i-2)}$$

FIG. 4

APPARATUS, SYSTEM, AND METHOD FOR CONTROLLING A PROCESSING SYSTEM

BACKGROUND OF THE INVENTION

1. Field of the Invention

This invention relates to processing systems and more particularly relates to optimizing the performance of processing systems.

2. Description of the Related Art

Processing systems respond to increased load with some degree of decreasing performance, or in other words, increases in throughput result in an increase in response time. The relationship between the two variables may appear to be linear at low throughput levels, since unpredictable (Poisson) arrivals can result in queue delays within a processor, router, or other resource. However, once average throughput approaches a limit, occasional bursts will result in more messages being queued, resulting in an increase in the average response time of messages. Consequently, relatively small increases in throughput may result in relatively greater increases in response time.

An unsystematic approach to the performance problem has been to determine a maximum acceptable response time for the system and use that as a limit for maximum throughput. This approach results in system utilization at a point that may be less than optimal. As systems become increasingly complex, the interactions between system components that are not operating at optimum performance can be bottlenecks for the overall system, greatly increasing overall inefficiency, possibly at an exponential rate. Locating and eliminating performance bottlenecks becomes proportionately difficult.

Methods for determining the point of optimum performance have focused on measuring the absolute change in response time for an increase in throughput, using a small number of data points. While this approach can approximate the optimum utilization, a method that utilizes a relative change in response time, using a large number of data points more accurately identifies a point of optimum system performance.

SUMMARY OF THE INVENTION

The present invention has been developed in response to the present state of the art, and in particular, in response to the problems and needs in the art that have not yet been fully solved by currently available processing system controls. Accordingly, the present invention has been developed to provide an apparatus, system, and method for controlling a processing system that overcome many or all of the above-discussed shortcomings in the art.

The apparatus to control a processing system is provided with a plurality of modules configured to functionally execute the necessary steps of controlling a processing system. These modules in the described embodiments include a data acquisition module that acquires performance data for a processing system, a data analysis module that calculates the slope between adjacent data points, a data normalization module that normalizes the data and computes a second order difference between the calculated slopes, a performance analysis module that determines the performance value that corresponds to the maximum second order difference, a performance comparison module that sets a preferred performance threshold, and a performance control module that controls the processing system to achieve the preferred performance threshold.

The apparatus, in one embodiment, is configured to limit the preferred performance threshold to a maximum range value deemed acceptable to the designers or users of the processing system. For example, the performance threshold may be limited by the maximum acceptable response time for users of the processing system.

A system of the present invention is also presented to control a processing system. The system may include client workstations that issue service requests, a remote firewall, a network such as the internet that transmits service requests, a web server that presents a user interface to the client workstations, a performance optimizer that optimizes performance of the processing system, application servers that service requests issued by the client workstations, and database servers that provide data to support the application servers.

A method of the present invention is also presented for controlling a processing system. The method in the disclosed embodiments substantially includes the steps necessary to carry out the functions presented above with respect to the operation of the described apparatus and system. In one embodiment, the method includes acquiring performance data, calculating the slope of adjacent performance data points, computing a second order difference between normalized slope values, determining a performance value corresponding to the maximum second order difference in slope values, setting a performance threshold to correspond to the maximum second order difference in slope values, determining whether the processing system is operating at the threshold, and adjusting the processing system to achieve the threshold.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 4 is a formula diagram illustrating one embodiment of performance optimization formulae in accordance with the present invention.

DETAILED DESCRIPTION OF THE INVENTION

Figure 1:
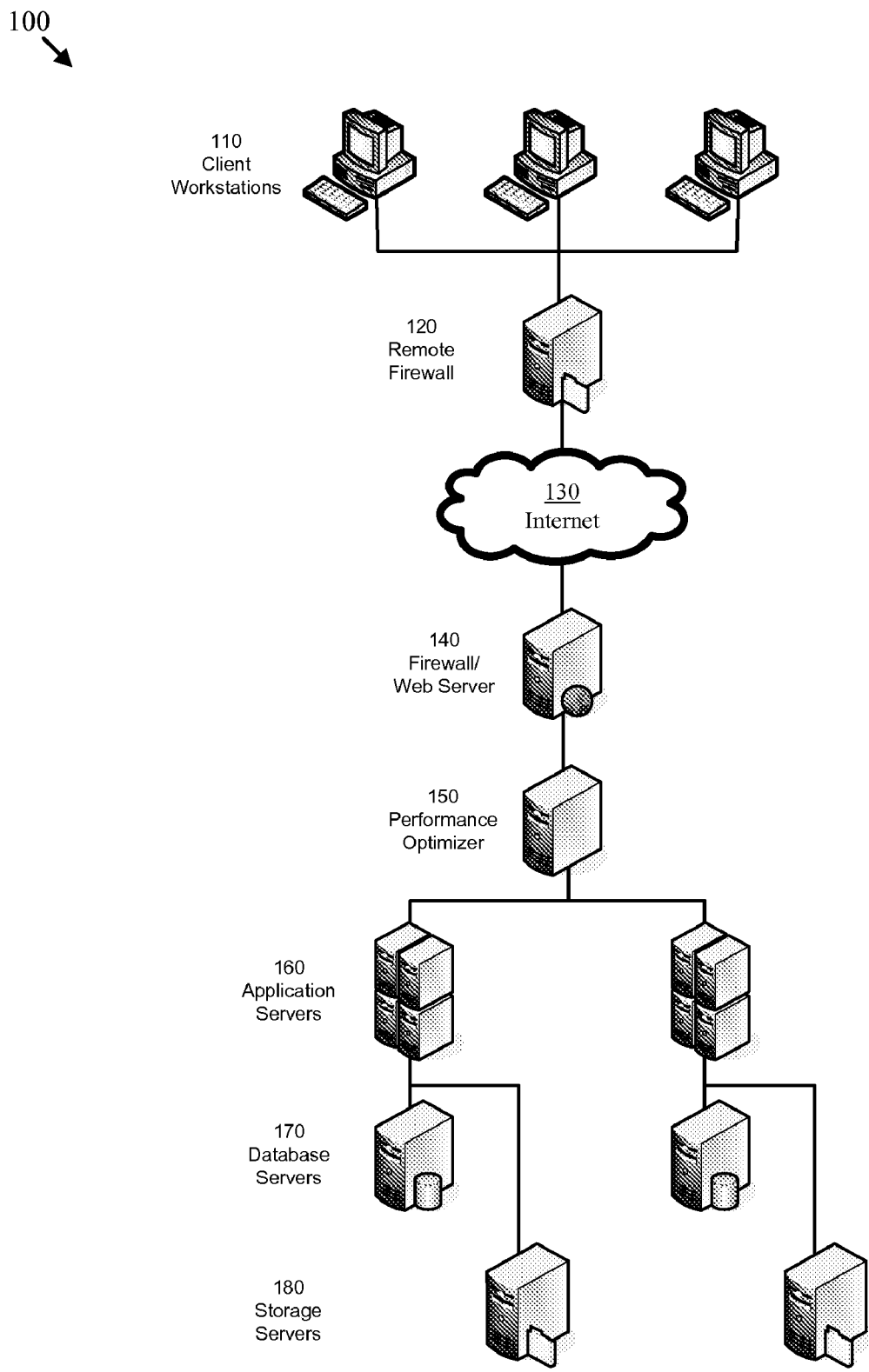
FIG. 1 is a schematic block diagram illustrating one embodiment of a typical environment in which the present invention may be deployed.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any form capable of causing execution of a program of machine-readable instructions on a digital processing apparatus. A computer readable medium may be embodied by a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 is a schematic block diagram illustrating one embodiment of a typical environment 100 in which the present invention may be deployed. As depicted, the environment 100 includes such components as client workstations 110, a remote firewall 120, the internet 130, a firewall/web server 140, a performance optimizer 150, application servers 160, database servers 170, and storage servers 180.

In one embodiment, client workstations 110 issue service requests to the application servers 160 via the remote firewall 120, the internet 130, and the firewall/web server 140. The application servers 160 utilize the database servers 170 and storage servers 180 in servicing requests issued by the client workstations 110. The performance optimizer 150 measures the throughput and response time for service requests to the application servers 160, calculates a maximum throughput rate for an acceptable response time threshold, and optimizes throughput for the response time threshold by controlling the rate that service requests are delivered to the application servers 160 and by balancing the number of service requests between application servers 160.

Figure 2:
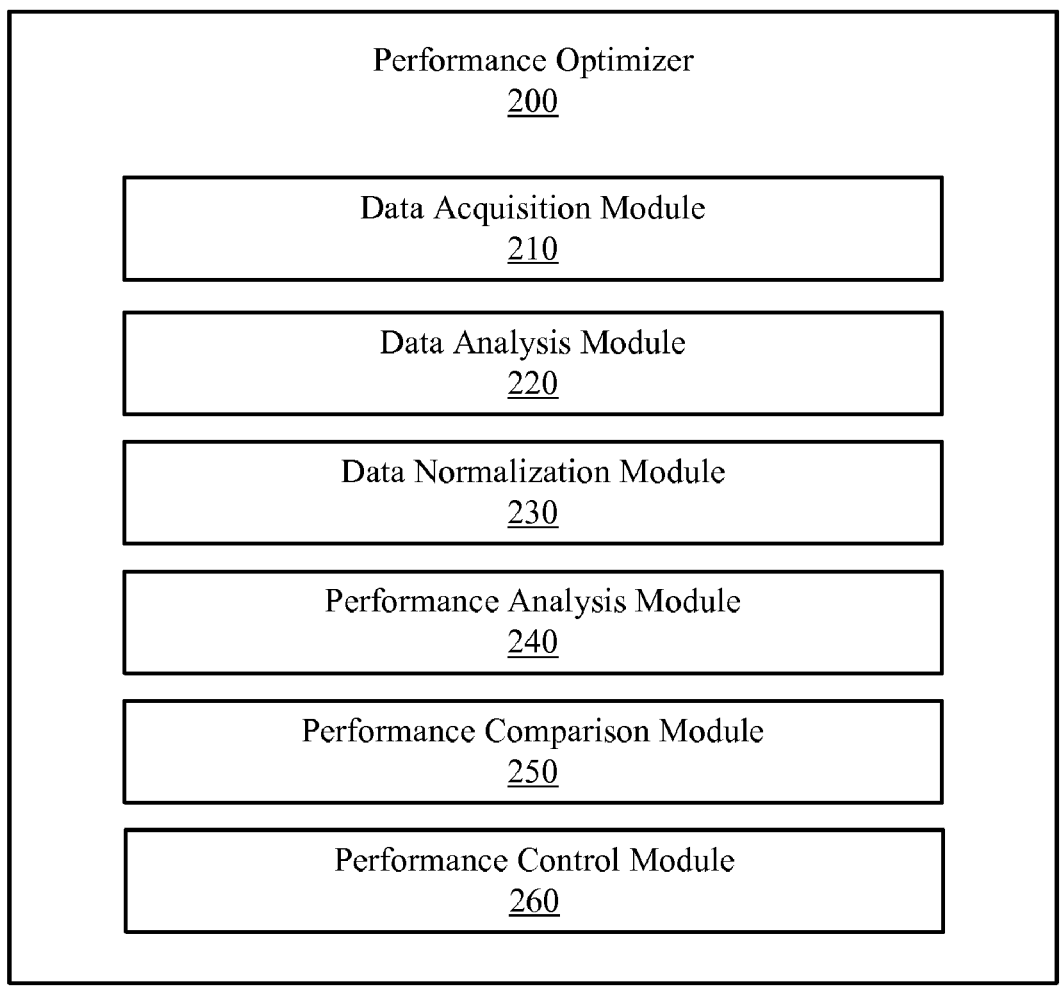
FIG. 2 is a schematic block diagram illustrating one embodiment of a performance optimization apparatus in accordance with the present invention.

FIG. 2 is a schematic block diagram illustrating one embodiment of a performance optimizer 200. The depicted performance optimizer 200 includes a data acquisition module 210, a data analysis module 220, a data normalization module 230, a performance analysis module 240, a performance comparison module 250, and a performance control module 260. The performance optimizer 200 facilitates optimizing the performance of a processing system, and is one example of the performance optimizer 150 depicted in FIG. 1.

The data acquisition module 210 acquires performance data pairs for a processing system. Each performance data pair comprises a domain value and a range value. Performance data pairs may be sorted in order of the domain value for each performance data pair. In one embodiment, the performance data pairs comprise utilization and response time. In another embodiment, the performance data pairs comprise throughput and response time.

The data analysis module 220 calculates the slope between adjacent performance data pairs. In one embodiment, the data analysis module 220 removes redundant performance data pairs from the set of acquired data before calculating the slope between adjacent performance data pairs. In some embodiments, the data analysis module 210 employs data smoothing techniques such as averaging several range values acquired for a single domain value, calculating a moving average, calculating an exponentially weighted average, or the like before calculating the slope between adjacent performance data pairs.

The data normalization module 230 calculates a second order difference between range slopes for a plurality of domain performance values. In one embodiment, the data normalization module 230 normalizes the range slopes by dividing each slope by a corresponding range data value before calculating the second order difference between range slopes for a plurality of domain performance values. In another embodiment, the data normalization module 230 normalizes the range slopes by dividing the slopes by an average range data value before calculating the difference between range slopes for a plurality of domain performance values. Normalization of the data facilitates analysis of relative change in the data, as opposed to the focus on absolute change employed by other approaches to processing system control.

The performance analysis module 240 determines a particular domain value that corresponds to a maximum normalized second order difference in the range slopes. In one embodiment, the performance analysis module 240 calculates an average of the domain values used to calculate the maximum normalized second order difference in the range slope.

The performance comparison module 250 adjusts a preferred performance threshold to correspond to the particular domain value determined by the performance analysis module 240. In one embodiment, the preferred performance threshold is limited by a maximum value deemed acceptable by the designers or users of the processing system. For example, the preferred performance threshold may be limited to a maximum acceptable response time for users of the processing system.

The performance control module 260 controls the processing system using the preferred performance threshold determined by the performance comparison module 250. In one embodiment, the performance control module 260 controls the processing system by limiting the rate service requests are queued for processing. In one embodiment, the performance control module 260 controls the processing system by balancing service requests between processing units within the processing system.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 3:
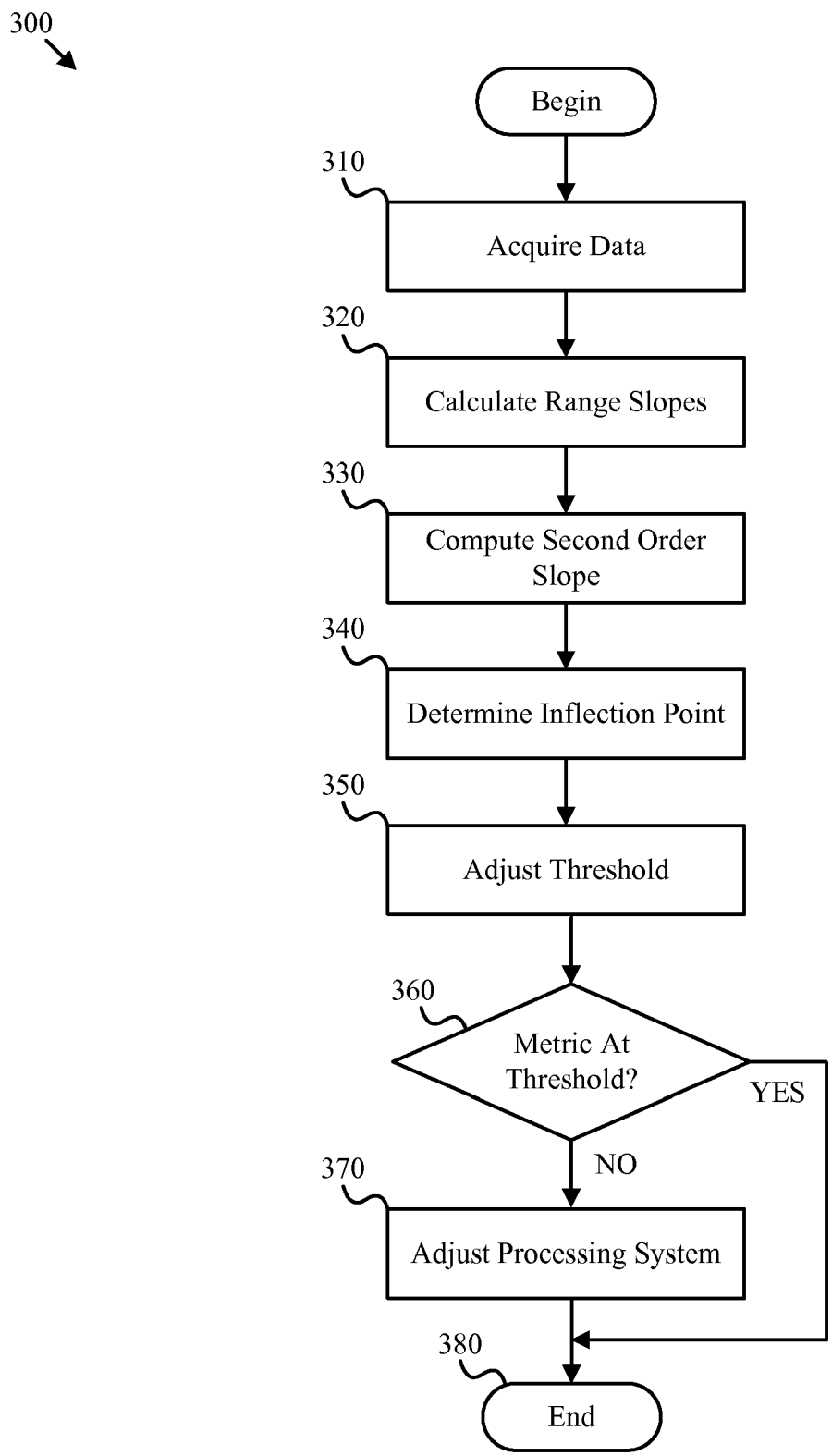
FIG. 3 is a schematic flow chart diagram illustrating one embodiment of a processing system control method in accordance with the present invention.

FIG. 3 is a schematic flow chart diagram illustrating one embodiment of a processing system control method 300 in accordance with the present invention. As depicted, the processing system control method 300 includes an acquire data operation 310, a calculate range slopes operation 320, a compute second order difference operation 330, a determine inflection point operation 340, an adjust threshold operation 350, a metric at threshold test 360, and an adjust processing system operation 370.

The acquire data operation 310 acquires performance data pairs for a processing system. Each performance data pair comprises a domain value and a range value. Performance data pairs may be sorted in order of the domain performance value for each performance data pair. In one embodiment, the performance data pairs comprise utilization and response time. In another embodiment, the performance data pairs comprise throughput and response time. The acquire data operation 310 is performed in conjunction with the data acquisition module 210.

The calculate range slopes operation 320 calculates the slope between adjacent performance data pairs. The calculate range slopes operation 320 may be performed in conjunction with the data analysis module 220. In one embodiment, the calculate range slopes operation 320 removes redundant performance data pairs from the set of acquired data before calculating the slope between adjacent performance data pairs. In other embodiments, the calculate range slopes operation 320 employs data smoothing techniques such as averaging several range values acquired for a single domain value, calculating a moving average, calculating an exponentially weighted average, or the like before calculating the slope between adjacent performance data pairs.

The compute second order difference operation 330 calculates a second order difference between range slopes for a plurality of domain performance values. The compute second order slope operation 330 may be performed in conjunction with the data normalization module 230. In one embodiment, the compute second order slope operation 330 normalizes the range slopes by dividing the slope by the range data value before calculating the second order difference between range slopes for a plurality of domain performance values. In one embodiment, the compute second order difference operation 330 normalizes difference calculations used to compute the second order difference in range slopes.

The determine inflection point operation 340 determines a particular performance value that corresponds to a maximum normalized second order difference in the range slope. In one embodiment, the determine inflection point operation 340 calculates an average of the domain values used to calculate the maximum normalized second order difference in the range slopes. The determine inflection point operation 340 is performed in conjunction with the performance analysis module 240.

The adjust threshold operation 350 adjusts a preferred performance threshold to correspond to the particular performance value determined by determine inflection point operation 340. The adjust threshold operation 350 may be performed in conjunction with the performance comparison module 250. In one embodiment, the preferred performance threshold is limited by a maximum range value deemed acceptable by the designers or users of the processing system. For example, the preferred performance threshold may be limited to provide a maximum acceptable response time for users of the processing system The metric at threshold test 360 compares the current performance metric for the processing system to the preferred performance threshold determined by the adjust threshold operation 350. In some embodiments, the metric at threshold test 360 determines whether the current performance metric is within an accepted percentage of the preferred performance threshold. If the current performance metric is not equal to or within an acceptable percentage of the preferred performance threshold, the processing system control method 300 continues with the adjust processing system operation 370, otherwise the processing system control method 300 ends 380.

The adjust processing system operation 370 controls the processing system using the preferred performance threshold determined by the adjust threshold operation 350. The adjust processing system operation 370 may be performed in conjunction with the performance control module 260. In one embodiment, the adjust processing system operation 370 controls the processing system by limiting the rate service requests are queued for processing. In one embodiment, the adjust processing system operation 370 controls the processing system by balancing service requests between processing units within the processing system. When the adjust processing system operation 370 is complete, the processing system control method 300 ends 380.

FIG. 4 is a formula diagram illustrating one embodiment of performance optimization formulae 400 in accordance with the present invention. The performance optimization formulae 400 include a slope formula 410, a first order difference formula 420, and a second order difference formula 430. The performance optimization formula 400 facilitates calculating the point of optimum performance for a processing system.

The slope formula 410 calculates the slope of adjacent performance data points. In the depicted embodiment, the slope formula 410 calculates a normalized slope by dividing the change in adjacent performance range values by one of the range values. In another embodiment, the slope formula 410 calculates a normalized slope by dividing the change in performance range values by the average of the range values.

The first order difference formula 420 calculates the change in relative slopes between adjacent pairs of performance data points. In the depicted embodiment, the first order difference formula 420 normalizes slope data by dividing the change in slope by one of the slope values. In another embodiment, the first order difference formula 420 normalizes slope data by dividing the change in slope by the average of the slope values. The first order difference formula 420 may be embodied in the calculate range slopes operation 320.

The second order difference formula 430 calculates the relative change in the slope change between adjacent performance data points. The second order slope formula 430 normalizes slope change data by dividing the difference in slope change values by one of the slope change values. In another embodiment, the second order slope formula 430 normalizes slope change data by dividing the difference in slope change values by the average of the slope change values. The range slope formula 420 may be embodied in the compute second order difference operation 330.

Figure 5:
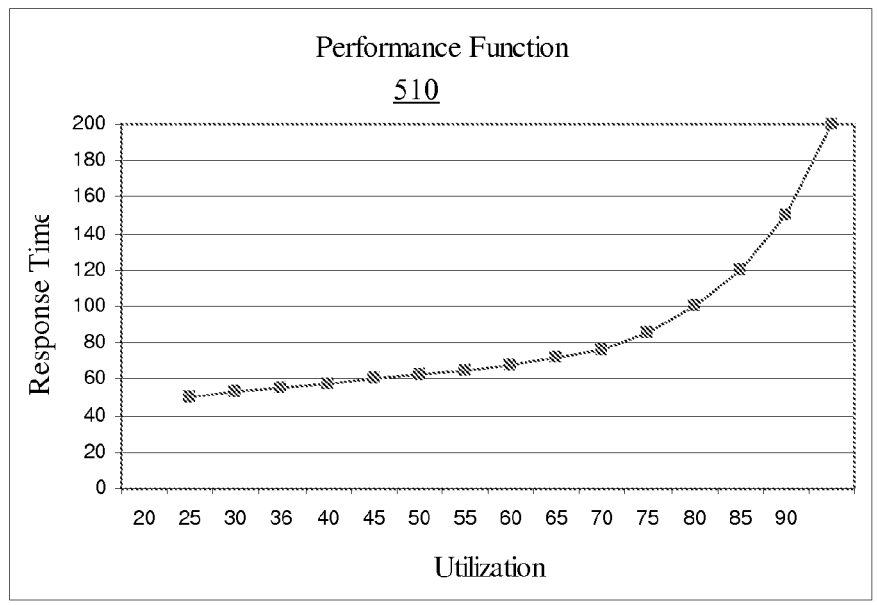
FIG. 5 is a block diagram illustrating one embodiment of a performance optimization calculation in accordance with the present invention, with sample data.

FIG. 5 is a block diagram illustrating one embodiment of a performance optimization calculation 500 in accordance with the present invention, with sample data. The performance optimization calculation 500 includes a performance function 510, and a optimal performance calculation 520. The optimal performance calculation 520 further includes sample data i 540, utilization 550, response time 560, slope 570, R 580 and M 590. The performance optimization calculation 500 may be performed in conjunction with the processing system control method 300. The performance optimization calculation 500 may be performed with as few as four performance data pairs. As the number of performance data pairs increases, the performance optimization calculation 500 identifies the point of optimal performance with increasing accuracy.

The performance function 510 defines the relationship between pairs of domain and range performance values. In the embodiment depicted in FIG. 5, the performance function relates utilization to response time. In another embodiment, the performance function 510 relates throughput to response time.

The optimal performance calculation 520 calculates an optimal performance point for the performance function 510. In the optimal performance calculation 520 depicted in FIG. 5, utilization 550 and response time 560 data pairs are sorted in order of utilization 550, with the order of data pairs identified by i 540. Slope 570 is the slope of adjacent performance data pairs. In the depicted embodiment, R 580 and M 590 are calculated using the performance optimization formulae 400.

As depicted, M 590 maximizes at a value of 3.38, corresponding to a utilization 550 value of 70.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method for controlling a processing system, the method comprising:
    acquiring a plurality of performance data pairs for a processing system, each performance data pair comprising a domain performance value and a range performance value, the plurality of performance data pairs sorted in order of the domain performance value for each performance data pair;
    calculating a range slope for adjacent domain values within the plurality of performance data pairs;
    computing a normalized second order difference in the range slope for a plurality of domain performance values;
    determining a particular performance value that corresponds to a maximum normalized second order difference in the range slope;
    adjusting a preferred performance threshold to correspond to the particular performance value; and
    controlling the processing system using the preferred performance threshold.

2. The method of claim 1, wherein acquiring a plurality of performance data pairs for a processing system comprises acquiring utilization performance data and response time performance data.

3. The method of claim 1, wherein acquiring a plurality of performance data pairs for a processing system comprises acquiring throughput performance data and response time performance data.

4. The method of claim 1, wherein controlling the processing system comprises controlling a rate that service requests are delivered to a command processor.

5. The method of claim 1, wherein controlling the processing system comprises balancing service requests delivered to a plurality of command processors.

6. An apparatus to control a processing system, the apparatus comprising:
    a data acquisition module configured to acquire a plurality of performance data pairs for a processing system, each performance data pair comprising a domain performance value and a range performance value, the plurality of performance data pairs sorted in order of the domain performance value for each performance data pair;
    a data analysis module configured to calculate a range slope for adjacent domain values within the plurality of performance data pairs;
    a data normalization module configured to compute a normalized second order difference in the range slope for a plurality of domain performance values;
    a performance analysis module configured to determine a particular performance value that corresponds to a maximum normalized second order difference in the range slope;
    a performance comparison module configured to adjust a preferred performance threshold to correspond to the particular performance value; and a performance control module configured to control the processing system using the preferred performance threshold.

7. The apparatus of claim 6, wherein the data acquisition module is further configured to acquire utilization performance data and response time performance data.

8. The apparatus of claim 6, wherein the data acquisition module is further configured to acquire throughput performance data and response time performance data.

9. The apparatus of claim 6, wherein the performance control module is further configured to control a rate that service requests are delivered to a command processor.

10. The apparatus of claim 6, wherein the performance control module is further configured to balance the number of service requests delivered to a plurality of command processors.

11. A system to control a processing system, the system comprising:
a plurality of client systems configured to issue service requests;
a plurality of command processors configured to receive and fulfill service requests, the plurality of command processors comprising at least a computer readable medium and a digital processing apparatus; and
a performance optimizer configured to,
acquire a plurality of performance data pairs for the plurality of command processors, each performance data pair comprising a domain performance value and a range performance value,
calculate a range slope for adjacent domain values within the plurality of performance data pairs,
compute a normalized second order difference in the range slope for a plurality of domain performance values,
determine a particular performance value that corresponds to a maximum normalized second order difference in the range slope,
adjust a preferred performance threshold to correspond to the particular performance value, and
control the plurality of command processors using the preferred performance threshold.

12. The system of claim 11, wherein the plurality of command processors comprises a plurality of servers selected from a group consisting of application servers, web servers, database servers, and storage servers.

13. The system of claim 11, wherein the performance optimizer is further configured to acquire utilization performance data and response time performance data.

14. The system of claim 11, wherein the performance optimizer is further configured to acquire throughput performance data and response time performance data.

15. The system of claim 11, wherein the performance optimizer is further configured to control a rate that service requests are delivered to a command processor.

16. The system of claim 11, wherein the performance optimizer is further configured to balance the number of service requests delivered to a plurality of command processors.

17. A computer program product comprising a computer readable medium having computer usable program code executable to perform operations for controlling a processing system, the operations of the computer program product comprising:
acquiring a plurality of performance data pairs for a processing system, each performance data pair comprising a domain performance value and a range performance value, the plurality of performance data pairs sorted in order of the domain performance value for each performance data pair;
calculating a range slope for adjacent domain values within the plurality of performance data pairs;
computing a normalized second order difference in the range slope for a plurality of domain performance values;
determining a particular performance value that corresponds to a maximum normalized second order difference in the range slope;
adjusting a preferred performance threshold to correspond to the particular performance value; and
controlling the processing system using the preferred performance threshold.

18. The computer program product of claim 17, wherein acquiring a plurality of performance data pairs for a processing system comprises acquiring utilization performance data and response time performance data.

19. The computer program product of claim 17, wherein acquiring a plurality of performance data pairs for a processing system comprises acquiring throughput performance data and response time performance data.

20. The computer program product of claim 17, wherein controlling the processing system comprises controlling a rate that service requests are delivered to a command processor.

* * * * *